US012776287B2

(12) United States Patent
Cheng et al.

(10) Patent No.: US 12,776,287 B2
(45) Date of Patent: Oct. 27, 2026

(54) DRIVING SEQUENCES FOR MULTI-PARTICLE ELECTROPHORETIC DISPLAYS PROVIDING IMPROVED COLOR STATES

(71) Applicant: E Ink Corporation, Billerica, MA (US)

(72) Inventors: Ying-Chuan Cheng, Chiayi County (TW); Lu-Ting Chien, Hsinchu (TW)

(73) Assignee: E Ink Corporation, Billerica, MA (US)

( * ) Notice: Subject to any disclaimer, the term of this patent is extended or adjusted under 35 U.S.C. 154(b) by 1 day.

(21) Appl. No.: 18/955,141

(22) Filed: Nov. 21, 2024

(65) Prior Publication Data

US 2025/0210001 A1 Jun. 26, 2025

Related U.S. Application Data

(60) Provisional application No. 63/612,848, filed on Dec. 20, 2023.

(51) Int. Cl.

| | |
|---|---|
| ***G09G 3/34*** | (2006.01) |
| ***G02F 1/167*** | (2019.01) |
| ***G02F 1/16757*** | (2019.01) |
| ***G02F 1/1685*** | (2019.01) |

(52) U.S. Cl.

CPC ............. *G09G 3/344* (2013.01); *G02F 1/167* (2013.01); *G02F 1/16757* (2019.01); *G02F 1/1685* (2019.01); *G09G 2320/0242* (2013.01); *G09G 2320/0666* (2013.01)

(58) Field of Classification Search

None

See application file for complete search history.

(56) References Cited

U.S. PATENT DOCUMENTS

| | | | |
|---|---|---|---|
| 6,241,921 | B1 | 6/2001 | Jacobson et al. |
| 6,672,921 | B1 | 1/2004 | Liang et al. |
| 6,788,449 | B2 | 9/2004 | Liang et al. |
| 6,866,760 | B2 | 3/2005 | Paolini, Jr. et al. |
| 6,922,276 | B2 | 7/2005 | Zhang et al. |
| 6,930,818 | B1 | 8/2005 | Liang et al. |
| 6,982,178 | B2 | 1/2006 | LeCain et al. |
| 7,002,728 | B2 | 2/2006 | Pullen et al. |

(Continued)

OTHER PUBLICATIONS

European Patent Office, "International Search Report and Written Opinion", PCT/US2024/056895, Feb. 7, 2025. Feb. 7, 2025.

*Primary Examiner* — Fred Tzeng

(74) *Attorney, Agent, or Firm* — Rajesh Vallabh

(57) ABSTRACT

Method for driving an electrophoretic display layer to color states having improved a* and/or b* values. The display layer includes an electrophoretic medium with first, second, third, and fourth types of particles. The first and third particles have charges of opposite polarity than the second and fourth particles. The first particles have greater charge magnitude than the third particles. The second particles have greater charge magnitude than the fourth particles. The method includes (a) applying a pre-push voltage pulse of the first polarity and a given amplitude to the display layer for a first time period to promote separation of the first and third particles; and (b) applying push-pull voltage pulses to the display layer for a second time period to drive the display to a color state of the third particles. The push-pull voltage pulses alternate between the first and second polarity with amplitudes greater than the given amplitude.

20 Claims, 8 Drawing Sheets

(56) References Cited

U.S. PATENT DOCUMENTS 7,012,600 B2 3/2006 Zehner et al.
7,046,228 B2 5/2006 Liang et al.
7,072,095 B2 7/2006 Liang et al.
7,075,502 B1 7/2006 Drzaic et al.
7,116,318 B2 10/2006 Amundson et al.
7,144,942 B2 12/2006 Zang et al.
7,312,784 B2 12/2007 Baucom et al.
7,411,719 B2 8/2008 Paolini, Jr. et al.
7,453,445 B2 11/2008 Amundson
7,535,624 B2 5/2009 Amundson et al.
7,679,814 B2 3/2010 Paolini, Jr. et al.
7,715,088 B2 5/2010 Liang et al.
7,839,564 B2 11/2010 Whitesides et al.
8,009,348 B2 8/2011 Zehner et al.
8,717,664 B2 5/2014 Wang et al.
9,082,351 B2 * 7/2015 Miyazaki .............. G06F 1/3265
9,116,412 B2 * 8/2015 Lin ........................ G09G 3/344
9,279,906 B2 3/2016 Kang
9,285,649 B2 3/2016 Du et al.
9,336,730 B2 * 5/2016 Inoue ..................... G09G 3/344
9,513,527 B2 12/2016 Chan et al.
9,812,073 B2 11/2017 Lin et al.
10,162,242 B2 12/2018 Wang et al.
10,339,876 B2 7/2019 Lin et al.
10,444,553 B2 10/2019 Laxton
10,657,869 B2 * 5/2020 Telfer ..................... G09G 3/344
11,175,527 B2 11/2021 Hu et al.
11,500,261 B2 11/2022 Wu et al.
12,517,412 B2 * 1/2026 Telfer .................... G02F 1/1685
2006/0132426 A1 * 6/2006 Johnson ................... G09G 3/34
345/107
2006/0158572 A1 * 7/2006 Zhou ...................... G09G 3/344
349/1
2006/0262082 A1 * 11/2006 Johnson ................. G09G 3/344
345/107
2007/0008278 A1 * 1/2007 Johnson ................. G09G 3/344
345/107
2007/0013683 A1 * 1/2007 Zhou ...................... G09G 3/344
345/204
2008/0231592 A1 * 9/2008 Johnson ................. G09G 3/344
345/107
2011/0102413 A1 * 5/2011 Hamer ............... H10K 59/8052
345/76
2014/0011913 A1 1/2014 Du et al.
2015/0005720 A1 1/2015 Zang
2016/0012710 A1 1/2016 Lu et al.
2017/0084217 A1 * 3/2017 Liu ........................ G09G 3/344
2017/0287377 A1 * 10/2017 Telfer ..................... G09G 3/344
2018/0136534 A1 * 5/2018 Telfer ................... G09G 3/2003
2020/0242993 A1 7/2020 Telfer et al.
2023/0004061 A1 * 1/2023 Telfer ...................... G02F 1/167
2023/0100320 A1 3/2023 O'Keeffe et al.
2023/0213790 A1 7/2023 Yezek et al.
2023/0273495 A1 8/2023 Gu et al.
2023/0351977 A1 * 11/2023 Crounse ................. G09G 3/344
2024/0061305 A1 * 2/2024 Telfer .................... G02F 1/1685
2024/0242685 A1 * 7/2024 Crounse ............... G09G 3/2003
2025/0085604 A1 * 3/2025 Telfer .................... G02F 1/1685
2025/0285600 A1 * 9/2025 Crounse ............... G09G 3/2096

* cited by examiner

P4 new PP + R PP

| | $L^*$ | $a^*$ | $b^*$ | R(%) |
|---|---|---|---|---|
| 2C | 22.19 | 34.33 | 21.98 | 3.57 |
| 2C | 22.2 | 34.49 | 22.4 | 3.57 |

Before

Pre-push small voltage
Optical results

| $L^*$ | $a^*$ | $b^*$ | R(%) |
|---|---|---|---|
| 24.61 | 37.44 | 27.17 | 4.29 |
| 24.63 | 37.13 | 26.62 | 4.30 |

After

FIG. 6

DRIVING SEQUENCES FOR MULTI-PARTICLE ELECTROPHORETIC DISPLAYS PROVIDING IMPROVED COLOR STATES

CROSS REFERENCE TO RELATED APPLICATIONS

This application claims priority from U.S. Provisional Patent Application No. 63/612,848 filed on Dec. 20, 2023 entitled DRIVING SEQUENCES FOR MULTI-PARTICLE ELECTROPHORETIC DISPLAYS PROVIDING IMPROVED COLOR STATES, which is hereby incorporated by reference in its entirety.

BACKGROUND

The present application generally relates to driving methods for color electrophoretic display devices providing high-quality color states at each pixel in the devices.

Electrophoretic displays (electronic paper, ePaper, etc.), such as commercially-available from E Ink Holdings (Hsinchu, Taiwan), have advantages of being light, durable, and eco-friendly because they consume very little power. The technology has been incorporated into electronic readers (e.g., electronic book, eBook) and other display environments (e.g., phones, tablets, electronic shelf tags, hospital signage, road signs, and mass transit time tables). The combination of low power consumption and sunlight readability has allowed for rapid growth in so called "no-plug and play" operations in which a digital signage system is merely attached to a surface and interfaces with exiting communication networks to provide regular updates of information or images. Because the display is powered with a battery or solar collector, there is no need to run utilities or even have a plug dangling from the display.

A variety of color options for electrophoretic displays have recently become available, ranging from improved color filter arrays, to complex subtractive pigment sets, to high-fidelity color options that rely on multiple sets of reflective color particles. This last system has seen great acceptance for commercial signage, such as in food stores, clothiers, and electronics retailers. In particular, three-color electrophoretic displays of the type described in U.S. Pat. No. 11,500,261 have been rapidly adopted for outdoor and indoor signage, and for room-temperature as well as refrigerated food sections. U.S. Pat. No. 11,500,261 is incorporated herein by reference in its entirety.

Three-particle electrophoretic displays are disclosed in U.S. Pat. Nos. 11,500,261; 8,717,664; 10,162,242; and 10,339,876. Four-particle electrophoretic displays are described in U.S. Pat. Nos. 9,285,649; 9,513,527; and 9,812,073.

A need exists for improved methods of driving multi-particle electrophoretic displays, particularly three and four-particle displays, to high-quality color states with improved CIELAB color space a* and b* values. Improved (higher) a* and b* values are typically perceived as "richer" or "more saturated" by viewers of the display, and are preferred over displays with lower a* or b* values, especially when used for digital signage, which may include colored text and images of items such as, e.g., food and other consumer goods.

SUMMARY

The driving methods disclosed herein address three and four-particle electrophoretic displays to generate high-quality color states having improved a* and b* values.

In a first aspect, a method is disclosed for driving an electrophoretic display layer to color states having improved a* and/or b* values. The electrophoretic display layer is disposed between a viewing surface including a light-transmissive electrode and a second surface on an opposite side of the display layer from the viewing surface. The second surface includes a driving electrode. The display layer includes an electrophoretic medium comprising a fluid and first, second, third and fourth types of particles dispersed in the fluid. The first, second, third and fourth types of particles have respectively first, second, third, and fourth optical characteristics different from one another. The first and third types of particles have charges of a first polarity and the second and fourth types of particles have charges of a second polarity opposite the first polarity. The first type of particles has a greater charge magnitude than the third type of particles, and the second type of particles has a greater charge magnitude than the fourth type of particles. The method comprises the following steps in order: (a) applying a pre-push voltage pulse of the first polarity and a given amplitude to the display layer for a first period of time to promote separation of the first and third types of particles; and (b) applying a series of push-pull voltage pulses to the display layer for a second period of time to drive the display layer to a color state of the third type of particle at the viewing side, the push-pull voltage pulses alternating between the first polarity and the second polarity and having amplitudes greater than the given amplitude of the pre-push voltage pulse.

In one or more embodiments, the first, second, third, and fourth types of particles are black, yellow, red, and white, respectively.

In one or more embodiments, the first polarity is positive, and the second polarity is negative.

In one or more embodiments, the amplitude of the pre-push voltage pulse is about 5 Volts.

In one or more embodiments, the push-pull voltage pulses alternate between about 7.5 Volts and about −15 Volts.

In one or more embodiments, the first period of time is about 1-2 sec.

In one or more embodiments, the pre-push voltage pulse comprises a single pulse.

In one or more embodiments, the electrophoretic display layer is encapsulated, preferably in microcapsules or sealed microcells.

In one or more embodiments, the method comprises driving a first pixel of the electrophoretic display layer using steps (a) and (b), and further comprises simultaneously driving a second pixel of the electrophoretic display layer proximate the first pixel to a color state of the first type of particle at the viewing side.

In another aspect of the invention, a method is disclosed for driving an electrophoretic display layer to color states having improved a* and/or b* values. The electrophoretic display layer is disposed between a viewing surface including a light-transmissive electrode and a second surface on an opposite side of the display layer from the viewing surface. The second surface includes a driving electrode. The display layer includes an electrophoretic medium comprising a fluid and first, second, and third types of particles dispersed in the fluid. The first, second, and third types of particles have respectively first, second, and third optical characteristics different from one another. The first and third types of particles have charges of a first polarity, and the second type of particles have charges of a second polarity opposite the first polarity. The first type of particles has a greater charge magnitude than the third type of particles. The method comprises the following steps in order: (a) applying a pre-push voltage pulse of the first polarity and a given amplitude to the display layer for a first period of time to promote separation of the first and third types of particles; and (b) applying a series of push-pull voltage pulses to the display layer for a second period of time to drive the display layer to a color state of the third type of particle at the viewing side, the push-pull voltage pulses alternating between the first polarity and the second polarity and having amplitudes greater than the given amplitude of the pre-push voltage pulse. In one or more embodiments, the first, second, and third types of particles are black, white, and red, respectively.

BRIEF DESCRIPTION OF THE DRAWINGS

FIG. 6 is a table showing improved a* and b* values of red pixels generated using driving waveforms having a pre-push voltage pulse in accordance with one or more embodiments.

DETAILED DESCRIPTION

As already mentioned, the present invention relates to a driving method for a display layer comprising an electrophoretic medium containing first, second, third and fourth types of particles all dispersed in a fluid and all having differing optical characteristics. These optical characteristics are typically colors perceptible to the human eye, but may be other optical properties, such as optical transmission, reflectance, and luminescence or, in the case of displays intended for machine reading, pseudo-color in the sense of a change in reflectance of electromagnetic wavelengths outside the visible range. The invention broadly encompasses particles of any colors as long as the multiple types of particles are visually distinguishable.

The four types of particles present in the electrophoretic medium may be regarded as comprising two pairs of oppositely charged particles. The first pair (the first and second types of particles) consists of a first type of positive particles and a first type of negative particles; similarly, the second pair (third and fourth types of particles) consists of a second type of positive particles and a second type of negative particles. Of the two pairs of oppositely charged particles, one pair (the first and second particles) carries a stronger charge than the other pair (third and fourth particles). Therefore the four types of particles may also be referred to as high positive particles, high negative particles, low positive particles, and low negative particles.

The term "charge potential", in the context of the present application, may be used interchangeably with "zeta potential" or with electrophoretic mobility. The charge polarities and levels of charge potential of the particles may be varied by the method described in U.S. Patent Application Publication No. 2014/0011913 and/or may be measured in terms of zeta potential. In one embodiment, the zeta potential is determined by Colloidal Dynamics AcoustoSizer IIM with a CSPU-100 signal processing unit, ESA EN #Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse™ 17000, available from Lubrizol Corporation, a Berkshire Hathaway company), with a weight ratio of 1:10 of the charge control agent to the particles. The mass of the diluted sample is determined and the sample is then loaded into the flow through cell for determination of the zeta potential. Methods and apparatus for the measurement of electrophoretic mobility are well known to those skilled in the technology of electrophoretic displays.

Figure 1:
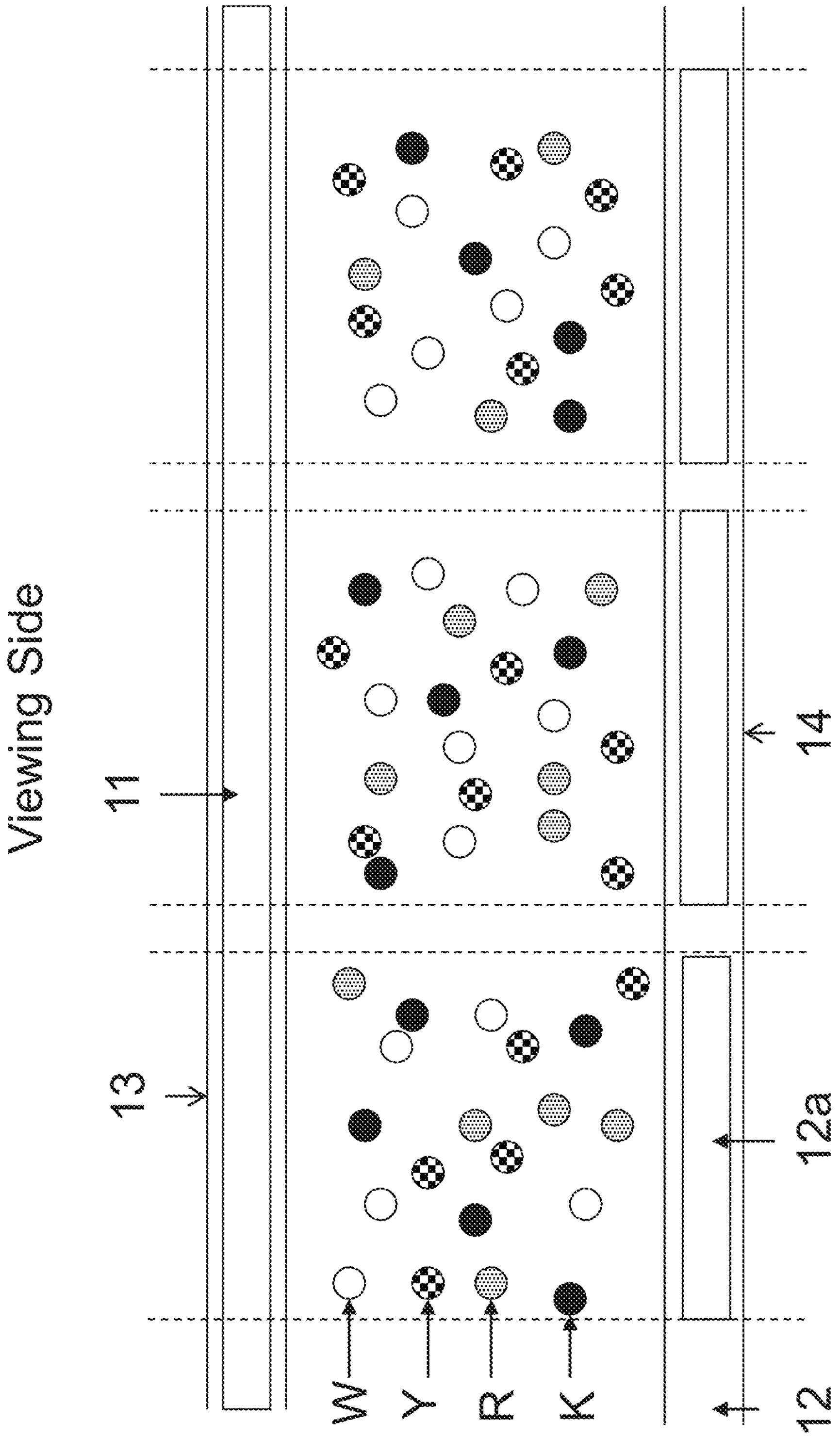
FIG. 1 is a schematic cross-section through a display layer containing four different types of particles and capable of displaying four different color states.

As an example shown in FIG. 1, first, black particles (K) and second, yellow particles (Y) are the first pair of oppositely charged particles, and in this pair, the black particles are the high positive particles and the yellow particles are the high negative particles. Third, red particles (R) and fourth, white particles (W) are the second pair of oppositely charged particles, and in this pair, the red particles are the low positive particles and the white particles are the low negative particles.

In another example not shown, the black particles may be the high positive particles, the yellow particles may be the low positive particles, the white particles may be the low negative particles, and the red particles may be the high negative particles. In another example not shown, the black particles may be the high positive particles, the yellow particles may be the low positive particles, the white particles may be the high negative particles, and the red particles may be the low negative particles. In another example not shown, the black particles may be the high positive particles, the red particles may be the low positive particles, the white particles may be the high negative particles, and the yellow particles may be the high negative particles. Of course, any particular color may be replaced with another color as required for the application. For example, if a specific combination of black, white, green, and red particles were desired, the high negative yellow particles shown in FIG. 1 could be replaced with high negative green particles.

In addition, the color states of the four types of particles may be intentionally mixed. For example, yellow pigment by nature often has a greenish tint and if a better yellow color state is desired, yellow particles and red particles may be used where both types of particles carry the same charge polarity and the yellow particles are higher charged than the red particles. As a result, at the yellow state, there will be a small amount of the red particles mixed with the greenish yellow particles to cause the yellow state to have better color purity.

The particles are preferably opaque, in the sense that they should be light reflecting not light transmissive. It be apparent to those skilled in color science that if the particles were light transmissive, some of the color states appearing in the following description of specific embodiments would be severely distorted or not obtained. White particles are of course light scattering rather than reflective, but care should be taken to ensure that not too much light passes through a layer of white particles. For example, if in the white state shown in FIG. 2F, discussed below, the layer of white particles allowed a substantial amount of light to pass through, and be reflected from the black and yellow particles behind it, the brightness of the white state could be substantially reduced.

In some embodiments, the particles are primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

White particles may be formed from an inorganic pigment, such as $TiO_2$, $ZrO_2$, ZnO, $Al_2O_3$, $Sb_2O_3$, $BaSO_4$, $PbSO_4$ or the like. Black particles may be formed from CI pigment black 26 or 28 or the like (e.g., manganese ferrite black spinel or copper chromite black spinel) or carbon black. The other colored particles (which are non-white and non-black) may be red, green, blue, magenta, cyan, yellow or any other desired colored, and may be formed from, e.g., CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. The colored particles may also be inorganic pigments, such as red, green, blue and yellow. Examples may include, but are not limited to, CI pigment blue 28, CI pigment green 50 and CI pigment yellow 227.

The fluid in which the four types of particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isoparaffin, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoroethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-coming (DC -200).

The percentages of different types of particles in the fluid may vary. For example, one type of particles may take up 0.1% to 10%, preferably 0.5% to 5%, by volume of the electrophoretic fluid; another type of particles may take up 1% to 50%, preferably 5% to 20%, by volume of the fluid; and each of the remaining types of particles may take up 2% to 20%, preferably 4% to 10%, by volume of the fluid.

The various types of particles may have different particle sizes. For example, the smaller particles may have a size that ranges from about 50 nm to about 800 nm. The larger particles may have a size that is about 2 to about 50 times, and more preferably about 2 to about 10 times, the sizes of the smaller particles.

An electrophoretic display normally comprises a layer of electrophoretic material and at least two other layers disposed on opposed sides of the electrophoretic material, one of these two layers being an electrode layer. In most such displays both the layers on opposed sides of the electrophoretic material are electrode layers, and one or both of the electrode layers are patterned to define the pixels of the display. For example, in a passive matrix system, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one display pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Numerous patents and applications assigned to or in the names of the Massachusetts Institute of Technology (MIT), E Ink Corporation, E Ink California, LLC, E Ink Holdings, Prime View International, and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see e.g., U.S. Pat. Nos. 7,002,728 and 7,679,814;

(b) Capsules, binders and encapsulation processes; see e.g., U.S. Pat. Nos. 6,922,276 and 7,411,719;

(c) Microcell structures, wall materials, and methods of forming microcells; see e.g., U.S. Pat. Nos. 7,072,095 and 9,279,906;

(d) Methods for filling and sealing microcells; see e.g., U.S. Pat. Nos. 7,144,942 and 7,715,088;

(e) Films and sub-assemblies containing electro-optic materials; see e.g., U.S. Pat. Nos. 6,982,178 and 7,839,564;

(f) Backplanes, adhesive layers and other auxiliary layers and methods used in displays; see e.g., U.S. Pat. Nos. 7,116,318 and 7,535,624;

(g) Color formation and color adjustment; see e.g., U.S. Pat. Nos. 7,075,502 and 7,839,564;

(h) Methods for driving displays; see e.g., U.S. Pat. Nos. 7,012,600 and 7,453,445;

(i) Applications of displays; see e.g., U.S. Pat. Nos. 7,312,784 and 8,009,348; and (j) Non-electrophoretic displays, as described in U.S. Pat. No. 6,241,921 and U.S. Patent Applications Publication No. 2015/0277160; and applications of encapsulation and microcell technology other than displays; see e.g., U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see e.g., the aforementioned U.S. Patent Application Publication No. 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, e.g., International Application Publication No. WO 02/01281, and U.S. Pat. No. 6,788,449.

Preferred embodiments of the invention will now be described in detail, though by way of illustration only, with reference to the accompanying drawings.

FIG. 1 is a schematic cross-section through a display layer that can be driven by methods of the present invention. The display layer has two major surfaces, a first, viewing surface 13 (the upper surface as illustrated in FIG. 1) through which a user views the display, and a second surface 14 on the opposed side of the display layer from the first surface 13. The display layer comprises an electrophoretic medium comprising a fluid and first, black particles (K) having a high positive charge, second, yellow particles (Y) having a high negative charge, third, red particles (R) have a low positive charge, and fourth, white particles (W) having a low negative charge. It should be understood that the assignment of specific colors to specific charged particles is somewhat arbitrary and other color combinations could be substituted. Thus, the color displayed at the first surface 13 will depend upon which color is assigned to each charge/magnitude particle, e.g., the high positive charge particle. The display layer is provided with electrodes as known in the art for applying electric fields across the display layer, i.e., including two electrode layers, the first of which is a light-transmissive or transparent common electrode layer 11 extending across the entire viewing surface 13 of the display layer. This electrode layer 11 may be formed from indium tin oxide (ITO) or a similar light-transmissive conductor. The other electrode layer 12 is a layer of discrete pixel electrodes **12*a* on the second surface 14, these electrodes 12*a* defining individual pixel of the display, these pixels being indicated by dotted vertical lines in FIG. 1. Alternatively, the other electrode layer 12 could be a solid electrode, e.g., a metal foil, or a graphite plane, or a conductive polymer. Alternatively, electrode layer 12 could also be a light-transmissive or transparent electrode layer, similar to transparent common electrode layer 11. (An electric field is created for a pixel by the potential difference between a voltage applied to the common electrode and a voltage applied to the corresponding pixel electrode.) The pixel electrodes 12*a*** may form part of an active matrix driving system with, e.g., a thin film transistor (TFT) backplane, but other types of electrode addressing may be used provided the electrodes provide the necessary electric field across the display layer.

The pixel electrodes may be as described in U.S. Pat. No. 7,046,228. The pixel electrodes **12*a*** may form part of an active matrix thin film transistor (TFT) backplane, but other types of electrode addressing, e.g., segmented electrodes, may be used provided the electrodes provide the necessary electric field across the display layer.

In one embodiment, the charge carried by the "low charge" particles may be less than about 50%, preferably about 5% to about 30%, of the charge carried by the "high charge" particles. In another embodiment, the "low charge" particles may be less than about 75%, or about 15% to about 55%, of the charge carried by the "high charge" particles. In a further embodiment, the comparison of the charge levels as indicated applies to two types of particles having the same charge polarity. The charges on the "high positive" particles and the "high negative" particles may be the same or different. Likewise, the amplitudes of the "low positive" particles and the "low negative" particles may be the same or different. In any specific electrophoretic fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

FIGS. 2A-2F illustrate the four color states that can be displayed at the viewing surface of each pixel of the display layer shown in FIG. 1 and the transitions between them. As previously noted, the high positive particles are of a black color (K); the high negative particles are of a yellow color (Y); the low positive particles are of a red color (R); and the low negative particles are of a white color (W).

Figures 2A, 2B:
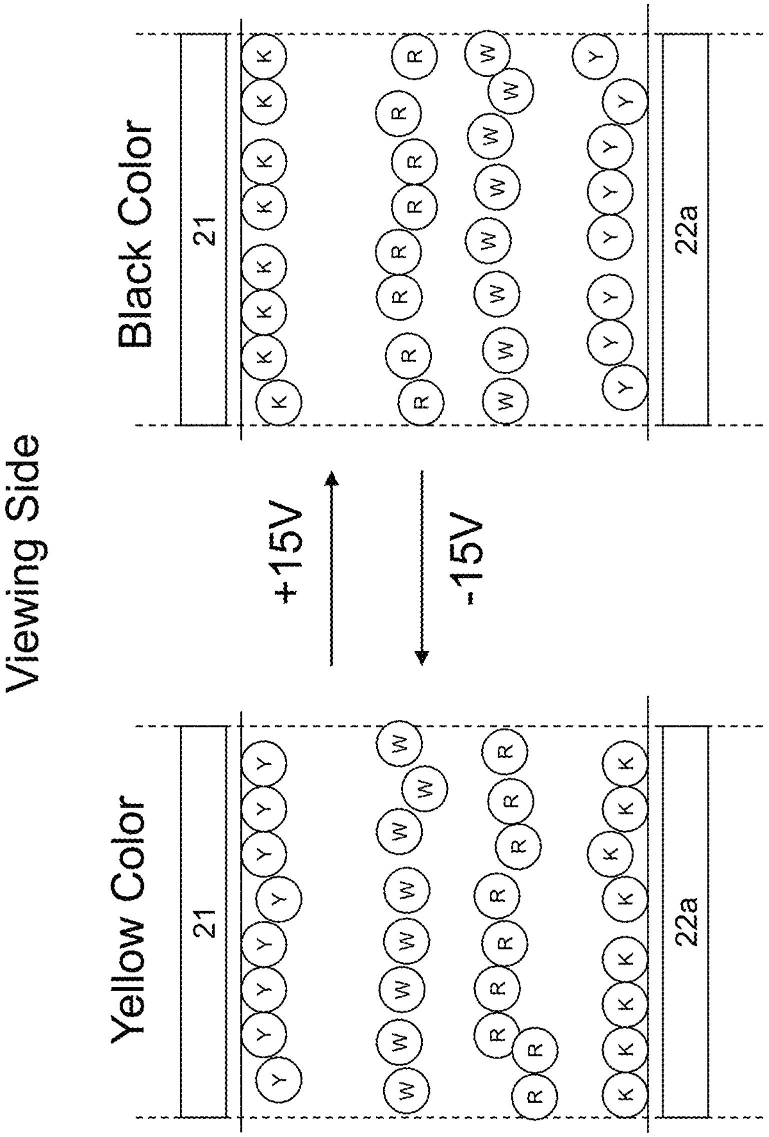
FIGS. 2A-2F are schematic cross-sections similar to those of FIG. 1 but illustrating changes in particle positions as a result of applying driving sequences of particular charge and polarity.

In FIGS. 2A and 2B, when a high negative driving voltage (referred to below as $V_{H2}$, e.g., −15V, e.g., −30V) is applied to the pixel electrode **22*a* (hereinafter, it will be assumed that the common electrode 21 will be maintained at 0V, so in this case the common electrode is strongly positive relative to the pixel electrode) for a time period of sufficient length, an electric field is generated to cause the high negative yellow particles to be driven adjacent the common electrode 21 and the high positive black particles driven adjacent the pixel electrode 22*a* to produce the state of FIG. 2A**.

The low positive red (R) and low negative white (W) particles, because they carry weaker charges, move slower than the higher charged black and yellow particles and as a result, they stay in the middle of the pixel, with white particles above the red particles, and with both masked by the yellow particles and therefore not visible at the viewing surface. Thus, a yellow color is displayed at the viewing surface.

Conversely, when a high positive driving voltage (referred to below as $V_{H1}$, e.g., +15V, e.g., +30V) is applied to the pixel electrode 22*a* (so that the common electrode 21 is strongly negative relative to the pixel electrode) for a time period of sufficient length, an electric field is generated to cause the high positive black particles to be driven adjacent the common electrode 21 and the high negative yellow particles adjacent the pixel electrode 22*a*. The resulting state of FIG. 2B is the exact inverse of FIG. 2A and a black color is displayed at the viewing surface.

Figures 2C, 2D:
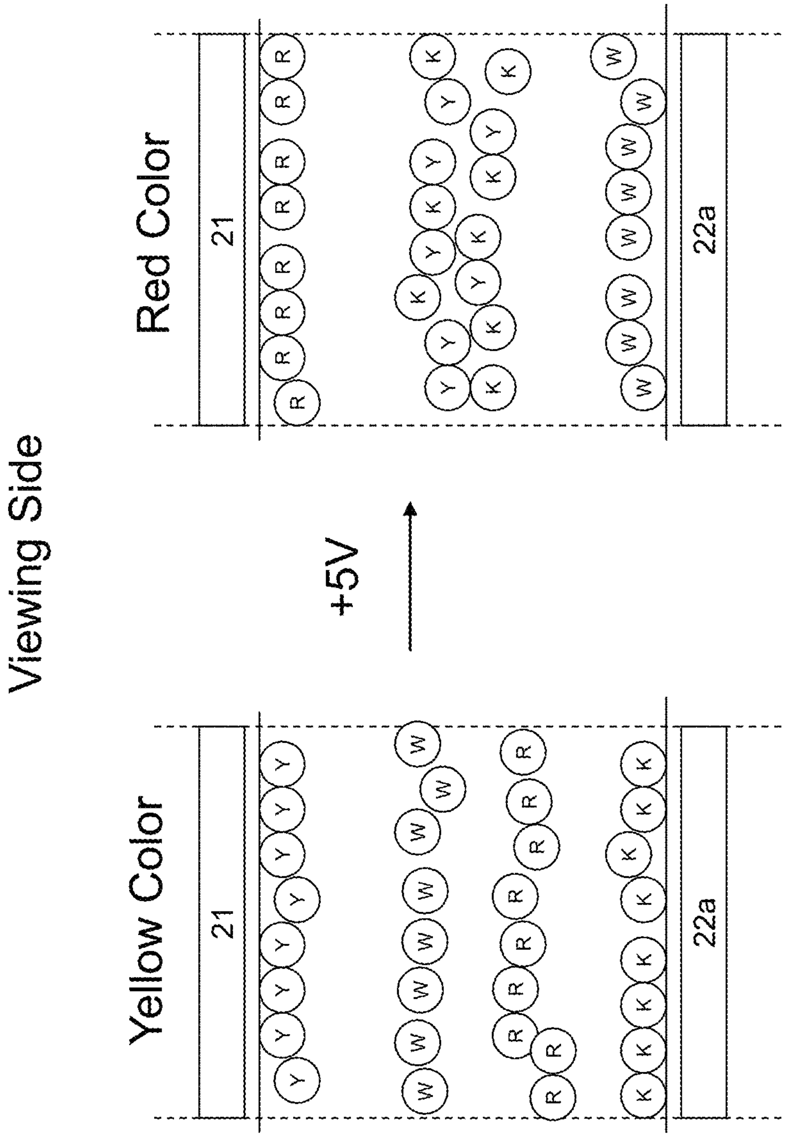

FIGS. 2C and 2D illustrate the manner in which the low positive (red) particles are displayed at the viewing surface of the display layer shown in FIG. 1. The process starts from the (yellow) state shown in FIG. 2A and repeated as FIG. 2C. A low positive voltage ($V_{L1}$, e.g., +3V, e.g., +5V, e.g., +10V) is applied to the pixel electrode 22*a* (i.e., the common electrode 21 is made slightly negative with respect to the pixel electrode) for a time period of sufficient length to cause the high negative yellow particles to move towards the pixel electrode 22*a* while the high positive black move towards the common electrode 21. However, when the yellow and black particles meet intermediate the pixel and common electrodes as shown in FIG. 2D, they remain at the intermediate position because the electric field generated by the low driving voltage is not strong enough to overcome the attractive forces between them. As shown, the yellow and black particles stay intermediate the pixel and common electrodes in a mixed state.

The term "attractive force" as used herein, encompasses electrostatic interactions, linearly dependent on the particle charge potentials, and the attractive force can be further enhanced by other forces, such as van der Waals forces, hydrophobic interactions and the like.

Obviously, attractive forces also exist between the low positive red particles and the high negative yellow particles, and between the low negative white particles and the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is also sufficient to separate the low negative white and low positive red particles, thereby causing the red particles to move adjacent the common electrode 21 and the white particles to move adjacent the pixel electrode 22*a*. As a result, the pixel displays a red color, while the white particles lie closest to the pixel electrode, as shown in FIG. 2D.

Figures 2E, 2F:
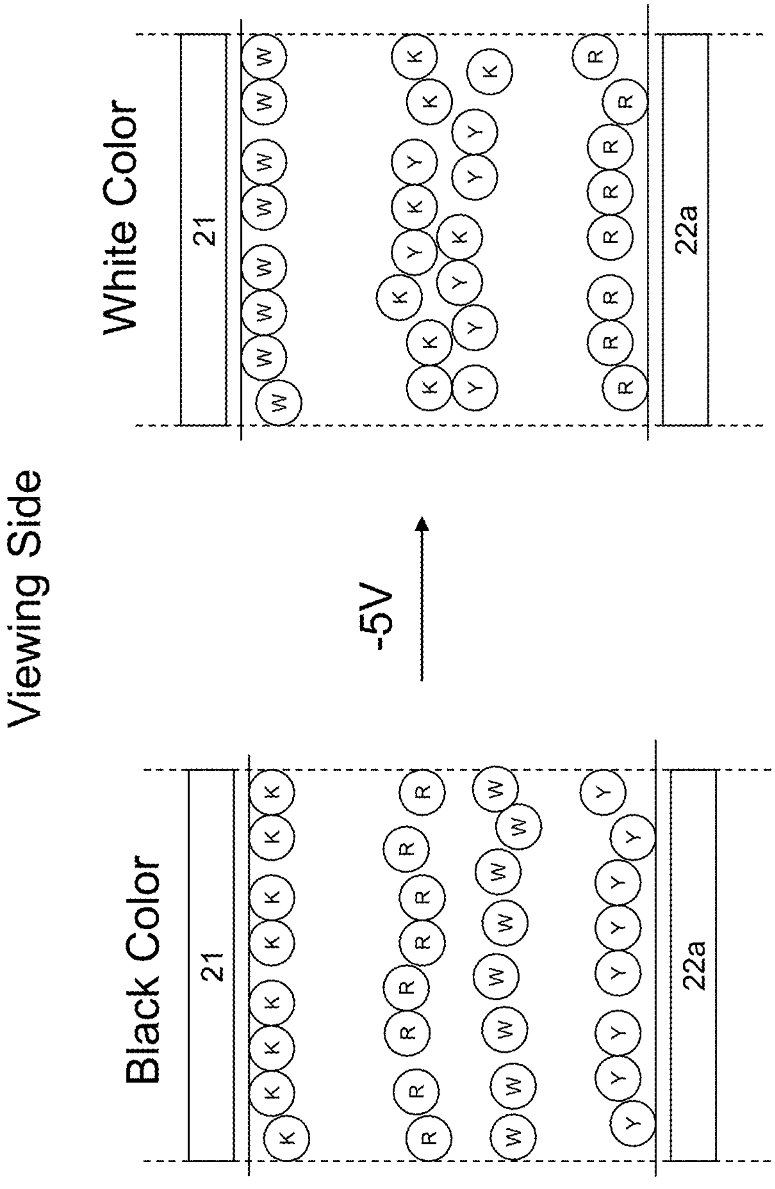

FIGS. 2E and 2F illustrate the manner in which the low negative (white) particles are displayed at the viewing surface of the display shown in FIG. 1. The process starts from the (black) state of FIG. 2B and repeated as FIG. 2E. A low negative voltage ($V_{L2}$, e.g., −3V, e.g., −5V, e.g., −10V) is applied to the pixel electrode (i.e., the common electrode is made slightly positive with respect to the pixel electrode) for a time period of sufficient length to cause the high positive black particles to move towards the pixel electrode 22*a* while the high negative yellow particles move towards the common electrode 21. However, when the yellow and black particles meet intermediate the pixel and common electrodes as shown in FIG. 2F, they remain at the intermediate position because the electric field generated by the low driving voltage is not strong enough to overcome the attractive forces between them. Thus, as previously discussed with reference to FIG. 2D, the yellow and black particles stay intermediate the pixel and common electrodes in a mixed state.

As discussed above with reference to FIGS. 2C and 2D, attractive forces also exist between the low positive red particles and the high negative yellow particles, and between the low negative white particles and both the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is sufficient to separate the low negative white and low positive red particles, thereby causing the white particles to move adjacent the common electrode 21 and the red particles to move adjacent the pixel electrode 22*a*. As a result, the pixel displays a white color, while the red particles lie closest to the pixel electrode, as shown in FIG. 2F.

In the display layer shown in FIGS. 1 and 2A-2F, the black particles (K) carry a high positive charge, the yellow particles (Y) carry a high negative charge, the red (R) particles carry a low positive charge, and the white particles (W) carry a low negative charge. However in principle, the particles carrying a high positive charge, or a high negative charge, or a low positive charge or a low negative charge may be of any colors. All of these variations are intended to be within the scope of this application.

It should also be noted that the low potential difference applied to reach the color states of FIGS. 2D and 2F may be about 5% to about 50% of the high potential difference required to drive the pixel from the color state of high positive particles to the color state of the high negative particles, or vice versa, i.e., as shown in FIGS. 2A and 2B.

While, for ease of illustration, FIGS. 1 and 2A-2F show the display layer as unencapsulated, the electrophoretic fluid may be filled into display cells, which may be cup-like microcells as described in U.S. Pat. No. 6,930,818. The display cells may also be other types of micro-containers, such as microcapsules, microchannels, or equivalents, regardless of their shapes or sizes. All of these are within the scope of the present application.

It will readily be apparent to those skilled in imaging science that if "clean", well saturated colors are to be obtained in the various color states illustrated in FIGS. 2A-2F, all non-black and non-white particles used in the electrophoretic medium should be light-reflecting rather than light-transmissive. (White particles are inherently light-scattering, while black particles are inherently light-absorbing.) For example, in the red color state of FIG. 2D, if the red particles were substantially light-transmissive, a substantial proportion of the light entering the electrophoretic layer through the viewing surface would pass through the red particles and a proportion of this transmitted light would be reflected back from the yellow particles "behind" (i.e., below as illustrated in FIG. 2D) the red particles. The overall effect would be serious "contamination" of the desired red color with a yellow tinge, a highly undesirable result.

Figure 3:
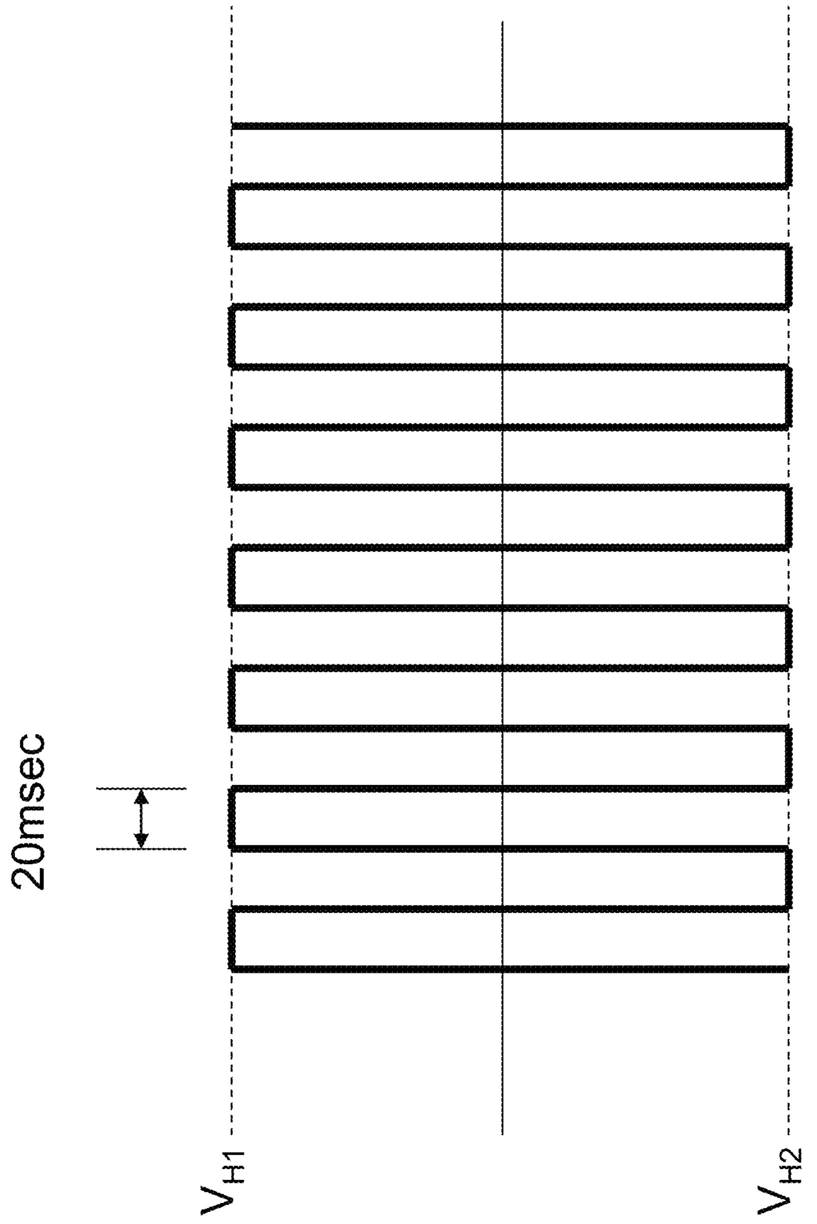
FIG. 3 shows a generic "shaking" waveform, which can be used in driving processes in various embodiments. When used with an active matrix display, the time width of each cycle (+HV to −HV) is at least two times the frame time for that display. However, there is no physical limitation to driving the electrophoretic medium, and the time width of each cycle may be shorter or longer than typical with an active matrix display.

In order to ensure both color brightness and color purity, a shaking waveform may be applied prior to driving the display layer from one color state to another color state. FIG. 3 is a voltage versus time graph of such a shaking waveform.

The shaking waveform may consist of repeating a pair of opposite driving pulses for many cycles. When used with an active matrix display each positive or negative pulse is at least the frame width of an update. For example, each pulse width may be on the order of 16 msec, when a display is updated at 60 Hz. However, in fact, the frame times are typically a bit longer due to various charge and decay times for the capacitive elements of the backplane. For example, as shown in FIG. 3, the shaking waveform may consist of a +15V pulse for 20 msec and a −15V pulse for 20 msec, with this pair of pulses being repeated 50 times. The total duration of such a shaking waveform would be 2000 msec. For ease of illustration, FIG. 3 illustrates only seven pairs of pulses.

The pulse width need not be limited to the frame time, and each pulse may include multiple frames, e.g., 40 msec pulse width, e.g., 60 msec pulse width, e.g., 80 msec pulse width, e.g., 100 msec pulse width. In some embodiments the pulse width of each element of the shaking pulse may be 80 msec or less, e.g., 60 msec or less, e.g., 40 msec or less, e.g., 20 msec or less. In practice, there may be at least 4 repetitions (i.e., four pairs of positive and negative pulses), e.g., at least 6 repetitions, e.g., at least 8 repetitions, e.g., at least 10 repetitions, e.g., at least 12 repetitions, e.g., at least 15 repetitions. Similarly, all subsequent drawings showing shaking waveforms simplify the shaking waveform in the same manner. The shaking waveform may be applied regardless of the optical state prior to a driving voltage being applied. After the shaking waveform is applied, the optical state (at either the viewing surface or the second surface, if visible) will not be a pure color, but will be a mixture of the colors of the various types of pigment particles. In some instances multiple shaking pulses will be delivered with a pause of 0V between shaking pulses to allow the electrophoretic medium to equilibrate and/or allow accumulated charge on the electrodes to dissipate.

Each of the driving pulses in the shaking waveform is applied for not exceeding 50% (or not exceeding 30%, 10% or 5%) of the driving time required for driving from the color state of the high positive particles to the color state of the high negative particles, or vice versa. For example, if it takes 300 msec to drive a display device from the color state of FIG. 2B, to the high positive particles to the color state of FIG. 2A, or vice versa, the shaking waveform may consist of positive and negative pulses, each applied for not more than 150 msec. In practice, it is preferred that the pulses be shorter.

For present purposes, a high driving voltage ($V_{H1}$ or $V_{H2}$) is defined as a driving voltage that is sufficient to drive a pixel from the color state of high positive particles to the color state of high negative particles, or vice versa (see FIGS. 2A and 2B). A low driving voltage ($V_{L1}$ or $V_{L2}$) is defined as a driving voltage that may be sufficient to drive a pixel to the color state of low charged particles from the color state of high charged particles (see FIGS. 2D and 2F). In general, the magnitude of $V_L$ (e.g., $V_{L1}$ or $V_{L2}$) is less than 50%, or preferably less than 40%, of the amplitude of $V_H$ (e.g., $V_{H1}$ or $V_{H2}$).

Waveforms with Pre-Push Pulses for Providing Improved Color States

In many multi-particle electrophoretic devices, it has been found that the positively-charged black and red particles form aggregates during use, which leads to black particle contamination of red pixels. It has been found, surprisingly, that this contamination can be overcome by using waveforms that include an added pre-push voltage pulse between the shaking pulses and the push-pull driving pulses. The pre-push pulse disaggregates the black and red particles. The separated particles respond better to the subsequent push-pull driving pulses, resulting in higher quality red states at pixels. In particular, the red states have improved CIELAB color space a* and b* values when evaluated with electro-optic metrology (see Example below).

Figure 4:
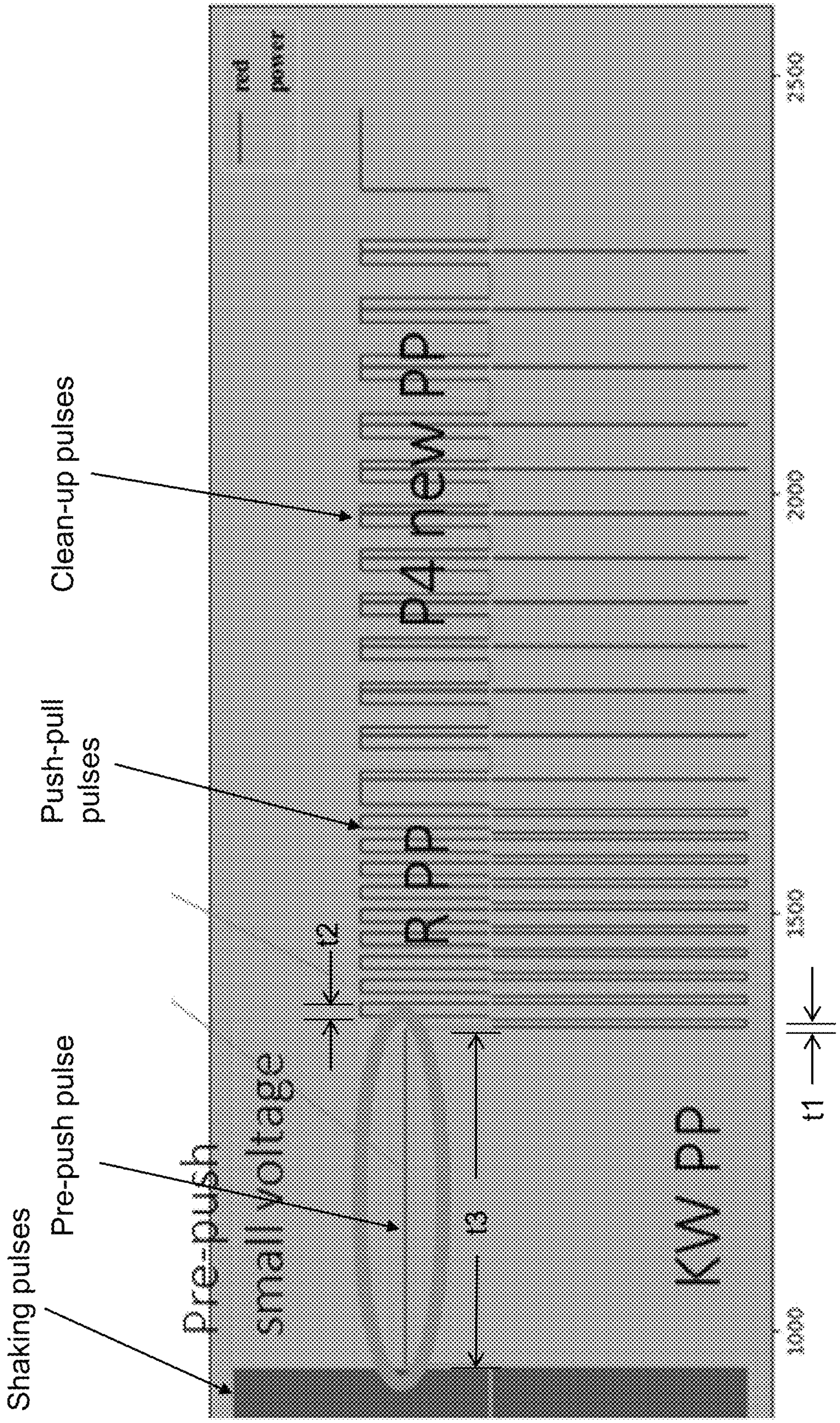
FIG. 4 illustrates a basic driving waveform in accordance with one or more embodiments for generating a red pixel in an electrophoretic display including a pre-push voltage pulse for promoting separation of the red particles from the other particles in the electrophoretic medium, resulting in a more saturated red optical state at the viewing surface.

FIG. 4 illustrates an exemplary waveform in accordance with one or more embodiments that may be used to effect the yellow to red (high negative to low positive) transition of FIGS. 2C and 2D. As with waveforms discussed above, the FIG. 4 waveform applies to electrophoretic media in which the black particles (K) carry a high positive charge, the yellow particles (Y) carry a high negative charge, the red (R) particles carry a low positive charge, and the white particles (W) carry a low negative charge. However in principle, the particles carrying a high positive charge, or a high negative charge, or a low positive charge, or a low negative charge may be of any color. All of these variations are intended to be within the scope of the invention.

In addition, while the figures included in this application depict four-particle electrophoretic media, waveforms with pre-push voltage pulses in accordance with various embodiments can be applied to any multi-particle electrophoretic media to improve optical states, including three-particle electrophoretic media containing black, white, and red particles. One example of such a three-particle electrophoretic medium contains black particles with a high positive charge, red particles with a low positive charge, and white particles with a high or low negative charge.

The FIG. 4 waveform includes a pre-push voltage pulse added between a series of shaking pulses and a series of push-pull driving voltage pulses. The waveform may further include clean-up or finishing pulses after the push-pull pulses. The function of the push-pull pulses is, of course, to effect an optical transition from an initial to a final optical state of a pixel. The function of the pre-push pulse is to promote separation of the red particles from the other particles (notably the black particles) in the electrophoretic medium enabling the push-pull pulses to effectively achieve a more saturated red optical state at the viewing surface.

The pre-push pulse is preferably a single voltage pulse having moderate or low voltage and a long duration relative to individual push-pull driving voltage pulses. In one or more embodiments, the pre-push pulse can have a voltage ranging from 3V-9V, e.g., 5V The pre-push pulse has lower voltage than the push-pull pulses, which alternate, e.g., between about 7.5V and about −15V as discussed below.

The pre-push pulse is applied for a period of t3, which may range from 800 msec to 10 sec, e.g., about 1-2 sec.

The push-pull driving pulses comprise a repeating series of pulses of opposite polarity. The pulses comprise a pulse having a high negative driving voltage (e.g., −15V) applied for a period of t1 and a pulse having a low positive driving voltage (e.g., 7.5V) for a period of t2. The high negative driving voltage drives the pixel towards the yellow state (see FIG. 2C), and the low positive driving voltage drives the pixel to the red state (see FIG. 2D).

The pulse t1 has a pulse width of between 40 to 400 msec, e.g., 200 msec. The pulse t2 has a pulse width of between 80 to 800 msec, e.g., 400 msec. The pulses are repeated for least 2 cycles (N>2), preferably at least 4 cycles, and more preferably at least 8 cycles. The red color becomes more intense after each driving cycle.

The shaking pulses preceding the pre-push voltage pulse can be similar to the exemplary shaking pulses described above and depicted in FIG. 3 comprising repeating pairs of opposite driving pulses for multiple cycles. As noted above, when used with an active matrix display, each positive or negative shaking pulse is at least the frame width of an update. For example, each pulse width may be on the order of one frame, i.e., 16 msec, when a display is updated at 60 Hz. However, in fact, the frame times are typically a bit longer due to various charge and decay times for the capacitive elements of the backplane. For example, the shaking waveform may comprise a +15V pulse for 20 msec and a −15V pulse for 20 msec, with this pair of pulses being repeated 50 times. Thus, the total duration of the shaking waveform can be 2000 msec, i.e., 2 seconds. The pulse width need not be limited to the frame time, and each shaking pulse may include multiple frames, e.g., 40 msec pulse width, e.g., 60 msec pulse width, e.g., 80 msec pulse width, e.g., 100 msec pulse width. In some embodiments the pulse width of each element of the shaking pulse may be 80 msec or less, e.g., 60 msec or less, e.g., 40 msec or less, e.g., 20 msec or less. In practice, there may be at least 4 repetitions (i.e., four pairs of positive and negative pulses), e.g., at least 6 repetitions, e.g., at least 8 repetitions, e.g., at least 10 repetitions, e.g., at least 12 repetitions, e.g., at least 15 repetitions. The shaking waveform may be applied regardless of the optical state prior to a driving voltage being applied. After the shaking waveform is applied, the optical state (at either the viewing surface or the second surface, if visible) will not be a pure color, but will be a mixture of the colors of the various types of pigment particles. In some instances multiple shaking pulses will be delivered with a pause of 0V between shaking pulses to allow the electrophoretic medium to equilibrate and/or allow accumulated charge on the electrodes to dissipate.

Figure 5:
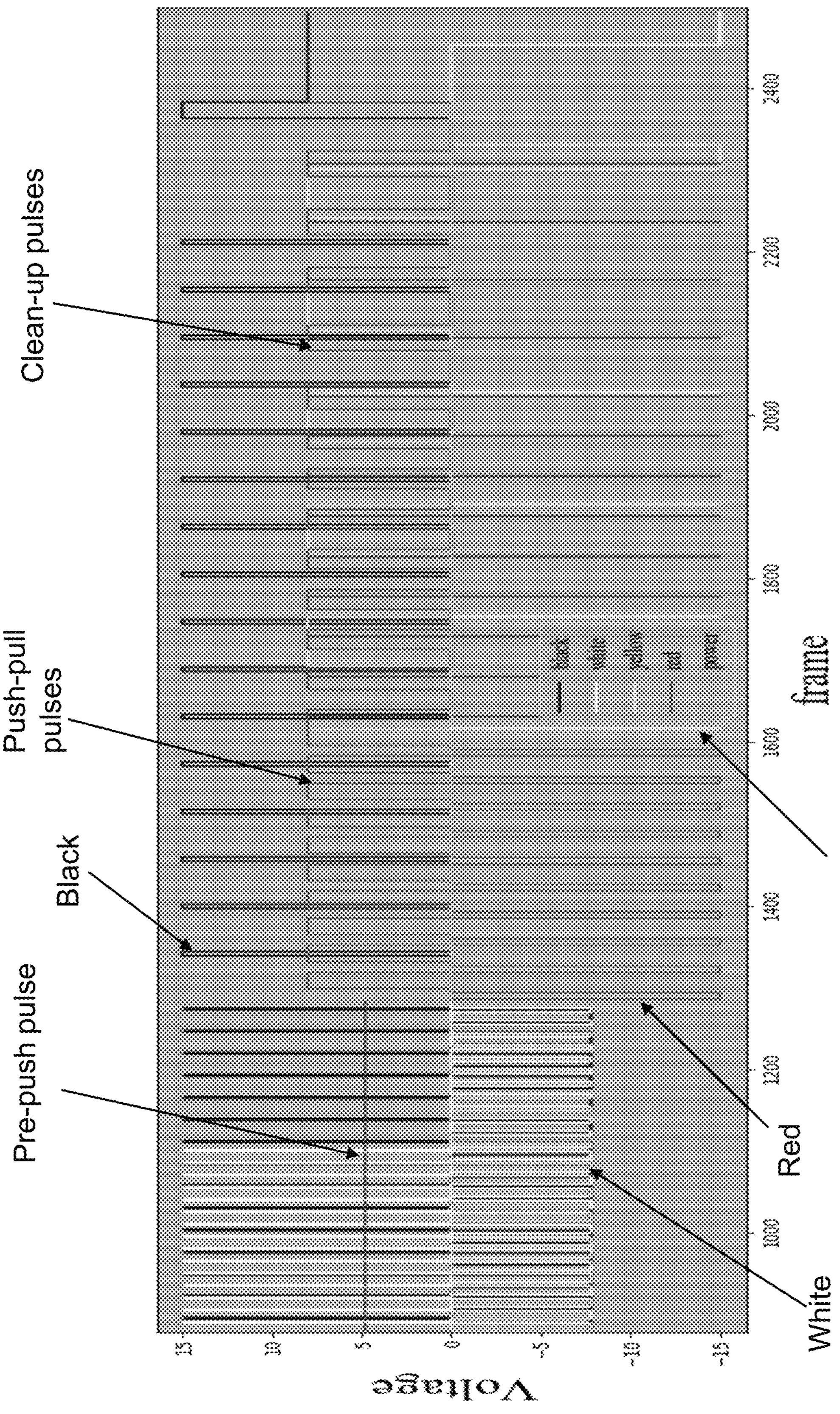
FIG. 5 illustrates basic driving waveforms in accordance with one or more embodiments for generating red, white, yellow, and black colors across multiple adjacent pixels in the electrophoretic display.

FIG. 5 shows the waveform of FIG. 4 for generating a red pixel along with waveforms simultaneously applied across multiple adjacent pixels in the electrophoretic display for generating white, yellow, and black colors.

While the inventors do not wish to be bound by the following proposed mechanism, it is surmised that the positively-charged black and red particles develop aggregates in part as a result of the waveforms simultaneously applied for generating black and white colors at adjacent pixels. The pre-push voltage pulse for the red pixel reduces the influence of waveforms applied to adjacent pixels thereby reducing the likelihood of forming aggregates. In this way, the positive red and black particles are better separated, and respond better to the later push-pull driving pulses. Thus, the addition of the pre-push pulse reduces color mixing, and the resulting color is more consistent when evaluated with electro-optic metrology (see Example below).

In addition to reducing coupling of red and black particles, an added benefit of waveforms having a pre-push voltage pulse is a diminished coupling of red and white particles. This leads to reduced contamination of red pixels by white particles, further improving red optical state consistency.

EXAMPLE

A four particle electrophoretic medium including black, white, yellow, and red particles of the type described above with reference to FIG. 1 was prepared and filled into an array of transparent microcells previously laminated to the front transparent electrode (PET-ITO) and sealed with an acrylate sealing layer. The filled and sealed layer of microcells was subsequently bonded to a thin-film transistor (TFT) backplane. The resultant display was driven with the waveforms depicted in FIG. 5 including a pre-push voltage pulse and separately with prior art waveforms without a pre-push voltage pulse. The results were evaluated for electro-optic performance using a spectrophotometric detector. As shown in the table of FIG. 6, the red state produced by the waveform depicted in FIG. 5 has improved CIELAB color space values, especially a* and b* values, compared to the red state produced by waveforms without a pre-push voltage pulse.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

The invention claimed is:

1. A method of driving an electrophoretic display layer to color states having improved a* and/or b* values, the electrophoretic display layer being disposed between a viewing surface including a light-transmissive electrode and a second surface on an opposite side of the display layer from the viewing surface, the second surface including a driving electrode, the display layer including an electrophoretic medium comprising a fluid and first, second, third and fourth types of particles dispersed in the fluid, wherein the first, second, third and fourth types of particles have respectively first, second, third, and fourth optical characteristics different from one another, the first and third types of particles having charges of a first polarity and the second and fourth types of particles having charges of a second polarity opposite the first polarity, wherein the first type of particles has a greater charge magnitude than the third type of particles, and the second type of particles has a greater charge magnitude than the fourth type of particles, the method comprising the following steps in order:

(a) applying a pre-push disaggregation voltage pulse of the first polarity and a given amplitude to the display layer for a first period of time configured to disaggregate the first and third types of particles, wherein the pre-push disaggregation voltage pulse comprises a single pulse and the first period of time comprises about 1 to 2 seconds; and (b) applying a series of push-pull driving voltage pulses to the display layer for a second period of time directly following the first period of time to drive the display layer to a color state of the third type of particle at the viewing side, the push-pull driving voltage pulses alternating between the first polarity and the second polarity and having amplitudes greater than the given amplitude of the pre-push disaggregation voltage pulse, wherein the push-pull driving voltage pulses having the first polarity each have a voltage pulse duration of about 80 to 800 milliseconds and the push-pull driving voltage pulses having the second polarity each have a voltage pulse duration of about 40 to 400 milliseconds.

2. The method of claim 1, wherein the third type of particle is red.

3. The method of claim 1, wherein the first, second, third, and fourth types of particles are black, yellow, red, and white, respectively.

4. The method of claim 1, wherein the first polarity is positive, and the second polarity is negative.

5. The method of claim 1, wherein the amplitude of the pre-push disaggregation voltage pulse is between 3 to 9 Volts.

6. The method of claim 1, wherein the amplitude of the pre-push disaggregation voltage pulse is about 5 Volts.

7. The method of claim 1, wherein the push-pull driving voltage pulses alternate between about 7.5 Volts and about −15 Volts.

8. The method of claim 1, wherein the electrophoretic display layer is encapsulated, preferably in microcapsules or sealed microcells.

9. The method of claim 1, wherein the method comprises driving a first pixel of the electrophoretic display layer using steps (a) and (b), and further comprises simultaneously driving a second pixel of the electrophoretic display layer proximate the first pixel to a color state of the first type of particle at the viewing side.

10. The method of claim 1, further comprising, prior to step (a), applying a series of shaking pulses comprising alternating positive and negative voltage pulses repeated a plurality of times to promote mixing of the first, second, third, and fourth types of particles dispersed in the fluid.

11. A method of driving an electrophoretic display layer to color states having improved a* and/or b* values, the electrophoretic display layer being disposed between a viewing surface including a light-transmissive electrode and a second surface on an opposite side of the display layer from the viewing surface, the second surface including a driving electrode, the display layer including an electrophoretic medium comprising a fluid and first, second, and third types of particles dispersed in the fluid, wherein the first, second, and third types of particles have respectively first, second, and third optical characteristics different from one another, the first and third types of particles having charges of a first polarity and the second type of particles having charges of a second polarity opposite the first polarity, wherein the first type of particles has a greater charge magnitude than the third type of particles, the method comprising the following steps in order:

(a) applying a pre-push disaggregation voltage pulse of the first polarity and a given amplitude to the display layer for a first period of time configured to disaggregate the first and third types of particles, wherein the pre-push disaggregation voltage pulse comprises a single pulse and the first period of time comprises about 1 to 2 seconds; and (b) applying a series of push-pull driving voltage pulses to the display layer for a second period of time directly following the first period of time to drive the display layer to a color state of the third type of particle at the viewing side, the push-pull driving voltage pulses alternating between the first polarity and the second polarity and having amplitudes greater than the given amplitude of the pre-push voltage pulse, wherein the push-pull driving voltage pulses having the first polarity each have a voltage pulse duration of about 80 to 800 milliseconds and the push-pull driving voltage pulses having the second polarity each have a voltage pulse duration of about 40 to 400 milliseconds.

12. The method of claim 11, wherein the third type of particle is red.

13. The method of claim 11, wherein the first, second, and third types of particles are black, white, and red, respectively.

14. The method of claim 11, wherein the first polarity is positive, and the second polarity is negative.

15. The method of claim 11, wherein the amplitude of the pre-push disaggregation voltage pulse is between 3 to 9 Volts.

16. The method of claim 11, wherein the amplitude of the pre-push disaggregation voltage pulse is about 5 Volts.

17. The method of claim 11, wherein the push-pull driving voltage pulses alternate between about 7.5 Volts and about −15 Volts.

18. The method of claim 11, wherein the electrophoretic display layer is encapsulated, preferably in microcapsules or sealed microcells.

19. The method of claim 11, wherein the method comprises driving a first pixel of the electrophoretic display layer using steps (a) and (b), and further comprises simultaneously driving a second pixel of the electrophoretic display layer proximate the first pixel to a color state of the first type of particle at the viewing side.

20. The method of claim 11, further comprising, prior to step (a), applying a series of shaking pulses comprising alternating positive and negative voltage pulses repeated a plurality of times to promote mixing of the first, second, and third types of particles dispersed in the fluid.

* * * * *